3,019,231
METHOD OF TRANSVINYLATING
William J. Peppel and Joel D. Watkins, Austin, Tex., assignors to Jefferson Chemical Company, Inc., Houston, Tex., a corporation of Delaware
No Drawing. Filed May 11, 1959, Ser. No. 812,099
8 Claims. (Cl. 260—307)

The present invention relates to a novel method of vinylating nitrogen-containing compounds such as urethanes and oxazolidones. More particularly, this invention relates to a method of replacing with a vinyl radical the hydrogen radical attached to the nitrogen atom in the nitrogen compounds selected from the group consisting of (1) 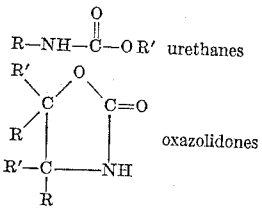 urethanes (2) 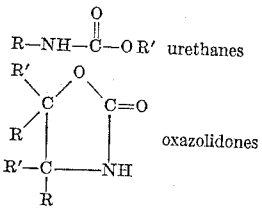 oxazolidones where R and R' are the same or different radicals selected from the group consisting of hydrogen, alkyl of from 1 to 18 carbon atoms, cycloalkyl of from 5 to 18 carbon atoms, aryl of from 6 to 10 carbon atoms, alkaryl of from 7 to 18 carbon atoms and aralkyl of from 7 to 12 carbon atoms. Specific examples of R and R' contemplated herein are hydrogen, methyl, ethyl, butyl, isobutyl, octyl, dodecyl, cyclopentyl, cyclohexyl, phenyl, naphthyl, methylphenyl, dimethylphenyl, isobutylphenyl, heptylphenyl, decylphenyl, benzyl, phenylpropyl, phenylhexyl and the like.

In the past one of the prior art methods of attaching a vinyl group to the nitrogen atom of the aforementioned nitrogen-containing compounds was accomplished by forming an N-chloroethyl derivative and then dehydrogenating with potassium tertiary butoxide to form the vinyl product. This method, although accomplishing vinylation, has the serious disadvantage of providing low yields and requiring expensive and elaborate process equipment. These disadvantages limit such a method to the laboratory. Another prior art method is to react nitrogen-containing compounds with acetylene under pressure in the presence of a basic catalyst such as sodium alkoxide. While this second method is commercially attractive and technically quite simple it will not succeed in N-vinylating urethanes and oxazolidones, presumably because the nitrogen is not active enough for the condensation reaction.

We have discovered a novel and commercially feasible method of vinylating at moderate temperatures urethanes and oxazolidones as heretofore defined which is simple, efficient and requires relatively uncomplicated process equipment. In addition, our novel method produces vinyl product yields heretofore unattainable by prior art methods.

Broadly our novel method comprises catalytically reacting nitrogen compounds as heretofore defined with a vinyl ether having from 3 to 20 carbon atoms of the formula $R''OCH=CH_2$. More particularly our method calls for the reaction of the nitrogen compounds contemplated herein and a vinyl ether as heretofore defined in a mol ratio of nitrogen compound to vinyl ether of between about 1:1 and 1:8, preferably between 1:2 and 1:4 in the presence of between .01 and 5% catalyst, preferably between 0.1 and 2.0% based on the combined weight of the reactants. Advantageously the reaction is performed at a temperature between about 0 and 100° C., preferably between 40 and 60° C.

In the above novel procedure $R''$ in the vinyl ether reactant can be any organic radical other than vinyl having from 1 to 18 carbon atoms and having a carbon atom attached to the ether oxygen atom. More particularly, the radical $R''$ may be an alkyl, aryl, cycloalkyl, aralkyl, alkaryl, or alkoxyalkyl. Specific examples of the radical $R''$ are methyl, ethyl, n-butyl, isobutyl, methoxyethyl, phenyl, cyclohexyl, benzyl, propylphenyl and the like.

The catalyst employed desirably is a mercuric salt of a mineral acid not weaker than phosphoric acid. Specific examples of the mercuric salt catalysts contemplated herein are mercuric sulfate, mercuric chloride, mercuric nitrate, mercuric phosphate and mercuric oxide-boron trifluoride. In the preferred method it is desirable to prepare the mercuric salt catalyst in situ (in the reaction medium) by reacting mercuric salt of a weak organic acid, e.g. mercuric acetate, with the strong mineral acid as heretofore defined. The catalyst prepared in situ dissolves more readily in the reaction medium and is substantially more reactive than the preformed catalyst.

In our novel method it is essential that the reactants be in the liquid state at the temperature of reaction. If any one of the reactants or a mixture thereof are solids, suitable solvent should be added to place them in solution. Preferably, the reaction mixture initially should be a single liquid phase containing both reactants and catalysts in the liquid state. However, the reaction may be carried out with the reactants in separate immiscible phases in which case it is necessary to rapidly and thoroughly stir the reactants during the course of the reaction.

Solvents which are suitable for the reaction are materials which are substantially chemically inert to the reactants and catalyst and which will exist as liquids at the reaction temperatures. Specific examples of solvents which are suitable are tetrahydrofuran, ethyl ether and isopropyl ether.

If any of the reactants, solvents or products substantially vaporize at the reaction temperature, superatmospheric pressure may be applied, e.g. up to 100 p.s.i.g. (pounds per square inch gauge) to maintain these ingredients in the liquid state. Alternatively, at atmospheric pressure components of the reaction mixture may be prevented from escaping by volatilization through the employment of a reflux condenser by well known means.

In a preferred method of operation mercuric acetate is first dissolved in the vinyl ether reactant, and then the nitrogen reactant is introduced into the solution. When either of the reactants is a solid, a liquid solvent therefor is preferably added to the vinyl ether reactant before the nitrogen reactant. Sulfuric acid is subsequently introduced dropwise in order to form the mercuric sulfate catalyst in situ and stirring is begun while simultaneously adjusting the reaction temperature to the desired degree.

At the end of the reaction period, which is normally from 0.5 to 10 hours, it is desirable to employ a procedure which will prevent reversal of the reaction to reform the reactants. One such procedure is to deactivate the mercuric catalyst, e.g., by chemical conversion. For example, the addition of from about 2 to 3% based on the combined weight of the reactants of an alkali metal carbonate or an alkali metal sulfide, e.g. sodium carbonate or sodium sulfide, will deactivate the mercuric catalyst by converting said catalyst to the inactive mercuric carbonate or sulfide which precipitates as a solid from the reaction mixture. Although deactivation of the catalyst is sufficient to prevent reversal of the reaction, further insurance against reversal may be accomplished by adding a selective solvent such as water to the reaction mixture which will extract the vinylated product from the excess vinyl ether reactant.

The vinylated reaction product is then separated from the reaction mixture or selective solvent by any of the standard methods, e.g. fractional distillation. If distillation is employed it is preferable to add a small amount, e.g. between about 0.01 and 0.1% based on the combined weight of the reactants of a polymerization inhibitor such as hydroquinone or copper resinate.

The following examples and table further illustrate our invention.

EXAMPLE I

This example illustrates the preparation of 3-vinyl-5-methyl-2-oxazolidone.

5 g. (grams) of mercuric acetate were dissolved in 400 g. (4 mols) of isobutyl vinyl ether contained in a 3-necked flask equipped with a heating mantle, condenser, thermometer and mechanical stirrer. After solution of the mercuric salt, 101 g. (1 mol) of 5-methyl-2-oxazolidone was added to the solution resulting in a two-phase system. 3 drops of concentrated (98%) sulfuric acid were slowly added after which the mixture was heated to reflux temperature (97–100° C.) and stirred for 2 hours. At the end of that period the reaction mixture was homogeneous and 100 ml. of hot (90° C.) water was introduced into the reaction mixture causing separation of the 3-vinyl-5-methyl-2-oxazolidone into the aqueuos phase thereby preventing reversal of the reaction to reform the reactants. 10 g. of sodium carbonate was then added to the reaction mixture with continued stirring in order to deactivate the mercuric sulfate catalyst. Subsequently, the reaction mixture was placed in a distillation flask which was attached to a 20 cm. x 2 cm. vacuum jacketed column packed with stainless steel turnings and equipped with a K-head condenser and fraction cutter. 0.1 g. of hydroquinone inhibitor was then added just prior to distillation to inhibit polymerization of the vinyl product. Distillation was begun to remove the excess isobutyl vinyl ether reactant, the isobutyl alcohol by-product and water. Upon the distillation of these three compounds the distillation pressure was reduced to 2.5–3.0 mm. of mercury absolute and 109 g. of 3-vinyl-5-methyl-2-oxazolidone product was recovered at 105–108° C. This represented a yield of 86% based on the weight of the initial charge of the 5-methyl-2-oxazolidone reactant.

The overall chemical reaction described in above Example I is further exemplified by the following equation:

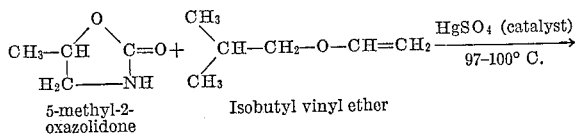

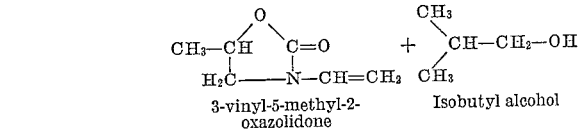

The procedural steps set forth in Example I were substantially repeated employing various reaction temperatures, reactant quantities and ratios, reaction times and vinyl ethers. The reaction conditions and results are reported in Table I:

TABLE I

| Run No. TV- | R in R—O—CH=CH$_2$ | Mols of R—O—CH-CH$_2$ | Mols of MOX[a] | Reac. time, hrs. | Reac. temp., °C. | Mols VMO[b] Product | Percent Yield of VMO[b] based on mols of MOX[a] |
|---|---|---|---|---|---|---|---|
| 15[c] | isobutyl | 8 | 2 | 1 | 82 | 0 | 0 |
| 6 | do | 4 | 3 | 3 | 80 | 0.20 | 25 |
| 27[d] | do | 2 | 1 | 3 | 10 | 0.15 | 15 |
| 28[d] | do | 2 | 1 | 4 | 25 | 0.35 | 35 |
| 29[d] | do | 2 | 1 | 3 | 32 | 0.37 | 37 |
| 30[d] | do | 2 | 1 | 2.33 | 34 | 0.38 | 38 |
| 31[d] | do | 2 | 1 | 2.5 | 31–69 | 0.41 | 41 |
| 17 | do | 2 | 1 | 1.5 | 40 | 0.35 | 35 |
| 1 | do | 2 | 0.5 | 2 | 0–15 | 0.20 | 40 |
| 5 | do | 4 | 1 | 2 | 97–100 | 0.86 | 86 |
| 9 | n-butyl | 4 | 1 | 5 | 75 | 0.72 | 72 |
| 7[e] | do | 4 | 1 | 2 | 100 | 0.30 | 30 |
| 20 | methoxyethyl | 2 | 1.5 | 2 | 40 | 0.30 | 25 |
| 24 | do | 2 | 1.5 | 1 | 40 | 0.30 | 20 |
| 21 | do | 2 | 1.25 | 2 | 40 | 0.24 | 25 |
| 25 | do | 2 | 1 | 2 | 3 | 0.40 | 40 |
| 26 | do | 2 | 1 | 0.75 | 10 | 0.26 | 26 |
| 23 | do | 2 | 1 | 1.33 | 40 | 0.45 | 45 |
| 18 | do | 2 | 1 | 2 | 40 | 0.35 | 35 |
| 19 | do | 2 | 2 | 3 | 50 | 0.28 | 28 |
| 13 | methyl | 8 | 1 | 3.25 | 5 | 1.37 | 68 |
| 11 | do | 6.9 | 1 | 2 | −2 | 0.58 | 58 |
| 8 | ethyl | 5 | 1 | 6 | 92 | 0.67 | 67 |
| 12 | do | 16.7 | 3 | 5 | 38 | 1.88 | 70 |
| 10 | do | 6.94 | 1 | | 40 | 0.69 | 69 |

[a] MOX=5-methyl-2-oxazolidone.
[b] VMO=3-vinyl-5-methyl-2-oxazolidone.
[c] No catalyst employed in Run No. TV-15.
[d] Tetrahydrofuran employed as the reaction solvent.
[e] Much of the vinyl ether reactant lost by frothing.

EXAMPLE II

This example illustrates the preparation of 3-vinyl-2-oxazolidone.

A stirred mixture of 174 g. (2 mol) of 2-oxazolidone, 408 g. (4 mol) of isobutyl vinyl ether and 10 g. mercuric acetate in 232 ml. of tetrahydrofuran was heated to the reflux temperature, about 76° C., until the 2-oxazolidone was substantially all dissolved. The reaction was then initiated by adding a solution of 0.32 g. sulfuric acid in 20 ml. tetrahydrofuran. External heating was discontinued and the reaction, which began immediately with mild evolution of heat, was allowed to continue until the mixture had cooled to near room temperature (20° C.). The product was then agitated while adding a solution of 10 g. of sodium carbonate and 15 g. of sodium sulfide monohydrate in 50 ml. of water. This was followed by filtration and transfer to a vessel equipped for distillation. Solvent and unreacted vinyl ether were removed by distillation at atmospheric pressure. The residue on cooling separated into two layers. Distillation of each of the separated layers under vacuum yielded a total of 91.8 g. of 3-vinyloxazolidone-2, the bulk of which was obtained from the lower layer. The 3-vinyl-2-oxazolidone boiled at 76.5–78° C. under 0.5 mm. Hg pressure absolute and had a refractive index of $n_D^{20}$ 1.4956.

EXAMPLE III

This examples illustrates the preparation of N-vinyl-N-methyl ethyl urethane.

Methyl vinyl ether (348 g., 6.0 mols) and mercuric acetate (7.5 g.) were charged to a flask equipped with a stirrer, thermometer and reflux condenser cooled by Dry Ice. The temperature of the mixture was held at 0° C. while 155 g. (1.5 mols) of N-methyl ethyl urethane was added slowly. Reaction was then initiated by adding 8 drops of a solution of concentrated sulfuric acid in diethyl ether. The reaction was allowed to proceed for 2.5 hours at 0–5° C., after which time 10 g. of anhydrous sodium carbonate was added. Stirring was continued an additional 10 minutes. The excess methyl vinyl ether was then collected by allowing the reaction mixture to warm until the vinyl ether distilled and passed from the flask to a trap. An additional 1 g. of sodium carbonate and 0.2 g. of hydroquinone were added to the residue which was then transferred to a distillation flask. After removing volatile reaction products at atmospheric pressure, 73 g. of N-vinyl-N-methyl ethyl urethane, boiling range 35–36° C. at 4.5 mm. Hg pressure absolute was collected. The product had a refractive index of $n_D^{20}$ 1.4501.

The vinylated compounds produced by our novel method are useful in that they readily form copolymers with substances such as vinyl acetate, acrylonitrile, methyl methacrylate, vinyl chloride, acrylic acid and acrylamide. The formed copolymers are resinous products useful as adhesives and surface coatings.

All percentages, parts and ratios heretofore and hereafter described are based on weight unless otherwise stated.

Obviously, many modifications and variations of the invention as hereinbefore set forth may be made without departing from the spirit and scope thereof, and therefore, only such limitations should be imposed as are indicated in the appended claims.

We claim:

1. A method of vinylating a compound selected from the group consisting of (1)

$$RNH-\overset{\overset{O}{\|}}{C}-OR'$$

(2)

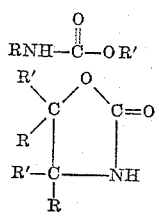

where R and R' are each a member selected from the group consisting of hydrogen, hydrocarbon alkly of from 1 to 18 carbon atoms, hydrocarbon cycloalkyl of from 5 to 6 carbon atoms in the ring and having from 5 to 18 carbon atoms, aryl hydrocarbon of from 6 to 10 carbon atoms, hydrocarbon alkaryl of from 7 to 18 carbon atoms and not more than 10 carbon atoms in the ring and hydrocarbon aralkyl of from 7 to 12 carbon atoms comprising reacting said compound with a vinyl ether of from 3 to 20 carbon atoms at a temperature between about 0 and 100° C. in the presence of a mercuric salt of a strong mineral acid to form the N-vinyl derivative of said compound, said vinyl ether having the formula:

$$R''OCH=CH_2$$

wherein R'' is a saturated $C_1$ to $C_{18}$ member selected from the group consisting of alkyl hydrocarbons, aryl hydrocarbons and methoxy alkyl.

2. A method of vinylating in accordance with claim 1 wherein said compound is 5-methyl-2-oxazolidone.

3. A method of vinylating in accordance with claim 1 wherein said vinyl ether is isobutyl vinyl ether.

4. A method of vinylating in accordance with claim 1 wherein said compound is N-methyl ethyl urethane.

5. A method of vinylating in accordance with claim 1 wherein said catalyst is mercuric sulfate.

6. A method according to claim 1 in which said catalyst is selected from the group consisting of mercuric sulfate, mercuric chloride, mercuric nitrate, mercuric phosphate and mercuric oxide-boron trifluoride.

7. A method for N-vinylating 5-methyl-2-oxazolidone which comprises reacting said 5-methyl-2-oxazolidone with isobutyl vinyl ether in a mol ratio of said ether to said oxazolidone of from about 1:1 to 1:8 at a temperature of from about zero to about 100° C. in the presence of from about 0.01 to about 5%, based on the combined weight of said ether and said oxazolidone, of mercuric sulfate to form said N-vinyl derivative, subsequently adding between about 2% and 3% of a member selected from the group consisting of an alkali metal carbonate and an alkali metal sulfide and between about 0.01 and 0.1% polymerization inhibitor based on the combined weight of said vinyl ether and said oxazolidone to the reaction mixture and recovering said N-vinylated derivative from said reaction mixture by fractional distillation.

8. A method for N-vinylating N-methyl ethyl urethane which comprises reacting said N-methyl ethyl urethane with isobutyl vinyl ether in a mol ratio of said ether to said N-methyl ethyl urethane of from about 1:1 to 1:8 at a temperature of from about zero to about 100° C. in the presence of from about 0.01 to about 5%, based on the combined weight of said ether and said N-methyl ethyl urethane, of mercuric sulfate to form said N-vinyl derivative, subsequently adding between about 2% and 3% of a member selected from the group consisting of an alkali metal carbonate and an alkali metal sulfide and between about 0.01 and 0.1% polymerization inhibitor based on the combined weight of said vinyl ether and said N-methyl ethyl urethane to the reaction mixture and recovering said N-vinylated derivative from said reaction mixture by fractional distillation.

References Cited in the file of this patent

UNITED STATES PATENTS 2,891,958     Walles et al. _____ June 16, 1959